(12) United States Patent
Itou

(10) Patent No.: US 6,698,659 B2
(45) Date of Patent: Mar. 2, 2004

(54) OPTICAL DATA FORM READING APPARATUS

(75) Inventor: Kunihiko Itou, Chiryu (JP)

(73) Assignee: Denso Corporation, Kariya (JP)

( * ) Notice: Subject to any disclaimer, the term of this patent is extended or adjusted under 35 U.S.C. 154(b) by 75 days.

(21) Appl. No.: 09/950,800

(22) Filed: Sep. 13, 2001

(65) Prior Publication Data

US 2002/0036233 A1 Mar. 28, 2002

(30) Foreign Application Priority Data

Sep. 27, 2000 (JP) ........................................ 2000-294095

(51) Int. Cl.$^7$ ................................................. G06K 7/10
(52) U.S. Cl. ............................. 235/462.42; 235/462.06
(58) Field of Search ........................ 235/462.06, 462.42, 235/455

(56) References Cited

U.S. PATENT DOCUMENTS

| 5,144,117 | A | * | 9/1992 | Hasegawa et al. .......... 235/455 |
| 5,280,161 | A | | 1/1994 | Niwa |
| 5,349,172 | A | | 9/1994 | Roustaei |
| 5,354,977 | A | | 10/1994 | Roustaei |
| 5,486,688 | A | * | 1/1996 | Iima et al. ............. 235/462.11 |
| 6,123,263 | A | * | 9/2000 | Feng .................... 235/462.42 |

FOREIGN PATENT DOCUMENTS

JP         A-9-128473         5/1997

* cited by examiner

*Primary Examiner*—Mark Tremblay
(74) *Attorney, Agent, or Firm*—Posz & Bethards, PLC

(57) ABSTRACT

A radius of curvature of a projection lens for projecting illumination light on bar codes varies in the arranging direction of the line sensor to collimate the illumination light at each point along the extending direction of the projection lends such that a focal distance at each point agrees with a distance between the point and the position of the LED.

3 Claims, 7 Drawing Sheets

OPTICAL DATA FORM READING APPARATUS

BACKGROUND OF THE INVENTION

1. Field of the Invention

This invention relates to an optical data form reading apparatus for reading an optical data form such as bar code data.

2. Description of the Prior Art

Optical data form reading apparatuses for reading an optical data form such as bar code data are known. FIG. 8 is a partial sectional plan view of a prior art illumination system for a bar code reader, and FIG. 9 is a perspective view of a prior art cylindrical lens 2 for projecting illumination light on a label having bar codes thereon. The cylindrical lens 2 has the same curvature R along the curved surface of the cylindrical lens 2 as shown in FIG. 9. Distances between the LEDs 1 and the cylindrical lens 2 vary in the LED arranging direction. Accordingly, the projected light pattern E is spread in the direction perpendicular to the LED arranging direction as shown in FIG. 10.

Japanese patent application provisional publication No. 9-128473 discloses another prior art optical data form reading apparatus as a bar code reader. FIG. 11 is a perspective view, partly a cut view, of this prior art bar code reader. FIG. 12 is a sectional view of the cylindrical lens 118 for this prior art bar code reader. The cylindrical lens 118 has a curved surface 117 as shown in FIG. 12. The curved surface 117 has successive three curvatures a, b, and c on the sectional plane in FIG. 12 to condense light from the LEDs 116 to adjust an illumination pattern to the reading area. However, the shape of the sectional area does not vary along the axis 119 of the cylindrical surface 117.

SUMMARY OF THE INVENTION

The aim of the present invention is to provide a superior optical data form reading apparatus.

According to the present invention, a first aspect of the present invention provides an optical data form reading apparatus comprising an objective lens; an optical sensor having a plurality of photosensitive elements arranged in a first direction which is perpendicular to an optical axis defined by said objective lens; a light emitting means for emitting illumination light; and a projection lens for condensing and projecting said illumination light on a readable target, said objective lens focusing reflected light from said readable target onto said optical sensor to generate an optical detection signal from said optical sensor, wherein said projection lens has at least a convex surface having curvature in a second direction which varies in said first direction to make said illumination light substantially collimated regarding said second direction along said projection lens in said first direction, and said second direction is perpendicular to said first direction and said optical axis.

According to the present invention, a second aspect of the present invention provides an optical data form reading apparatus based on the first aspect, wherein said light emitting means includes a plurality of light emitting elements arranged in said first direction beside said optical axis, said projection lens is arranged between said light emitting means and a reading plane of said readable target and extends in a third direction which is inclined to said optical axis, said convex surface curves only in said second direction, and said curvature just in front of each of said light emitting elements provides a focus point substantially at each of said light emitting elements.

According to the present invention, a third aspect of the present invention provides an optical data form reading apparatus based on the second aspect, wherein said projection lens has a flat surface on the side of said light emitting means and said convex surface at the other side, said convex surface curves only in said second direction, if it is assumed that said curvature at each point on said convex surface is Ra, a refraction index of said projection lens is n, and a focal distance at each point is f, $(1/f)=(n-1)(1/Ra)$.

According to the present invention, a fourth aspect of the present invention provides an optical data form reading apparatus comprising: an objective lens; an optical sensor having a plurality of photosensitive elements arranged in a first direction which is perpendicular to an optical axis defined by said object lens; a light emitting linear array including a plurality of light emitting elements arranged in said first direction for emitting illumination light; and a projection lens for condensing and projecting said illumination light on a readable target, said objective lens focusing reflected light from said readable target onto said optical sensor to generate an optical detection signal from said optical sensor, wherein said projection lens has at least a convex surface having curvature in a second direction varies in said first direction to make said illumination light substantially collimated regarding said second direction along said projection lens in said first direction, and said second direction is perpendicular to said first direction and said optical axis.

According to the present invention, a fifth aspect of the present invention provides an optical data form reading apparatus based on the fourth aspect, wherein said projection lens is arranged between said light emitting linear array and a reading plane of said readable target and extends in a third direction which is inclined to said optical axis, said convex surface curves only in said second direction, and said curvature just in front of each of said light emitting elements provides a focus point substantially at each of said light emitting elements.

According to the present invention, a sixth aspect of the present invention provides an optical data form reading apparatus based on the fifth aspect wherein said projection lens has a flat surface on the side of said light emitting array and said convex surface at the other side, said convex surface curves only in said second direction, if it is assumed that said curvature at each point on said convex surface is Ra, a refraction index of said projection lens is n, and a focal distance at each of said places is f, $(1/f)=(n-1)(1/Ra)$.

According to the present invention, a seventh aspect of the present invention provides an optical data form reading apparatus comprising an objective lens; an optical sensor having a plurality of photosensitive elements arranged in a first direction which is perpendicular to an optical axis defined by said object lens; light emitting means including a plurality of light emitting elements arranged in said first direction for emitting illumination light; and condensing means for condensing and projecting said illumination light on optical data form, said objective lens focusing reflected light from said optical data form onto said optical sensor to generate an optical detection signal indicative of said optical data form from said optical sensor, wherein said projection lens has at least a convex surface having curvature in a second direction varies in said first direction to make said illumination light substantially collimated such that a width an illuminated pattern on a reading plane of said optical data form in said second direction is substantially constant, and said second direction is perpendicular to said first direction and said optical axis.

According to the present invention, an eighth aspect of the present invention provides an optical data form reading apparatus based on the seventh aspect, wherein said light emitting means is arranged beside said optical axis, said projection lens is arranged between said light emitting means and a reading plane of said optical data form and extends in a third direction which is inclined to said optical axis, said convex surface curves only in said second direction, and said curvature just in front of each of said light emitting elements provides a focus point substantially at each of said photosensitive element.

According to the present invention, a ninth aspect of the present invention provides an optical data form reading apparatus based on the eighth aspect, wherein said projection lens has a flat surface on the side of said light emitting means and said convex surface at the other side, said convex surface curves only in said second direction, if it is assumed that said curvature at each point on said convex surface is Ra, a refraction index of said projection lens is n, and a focal distance at each of said places is f, $(1/f)=(n-1)(1/Ra)$.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 4:
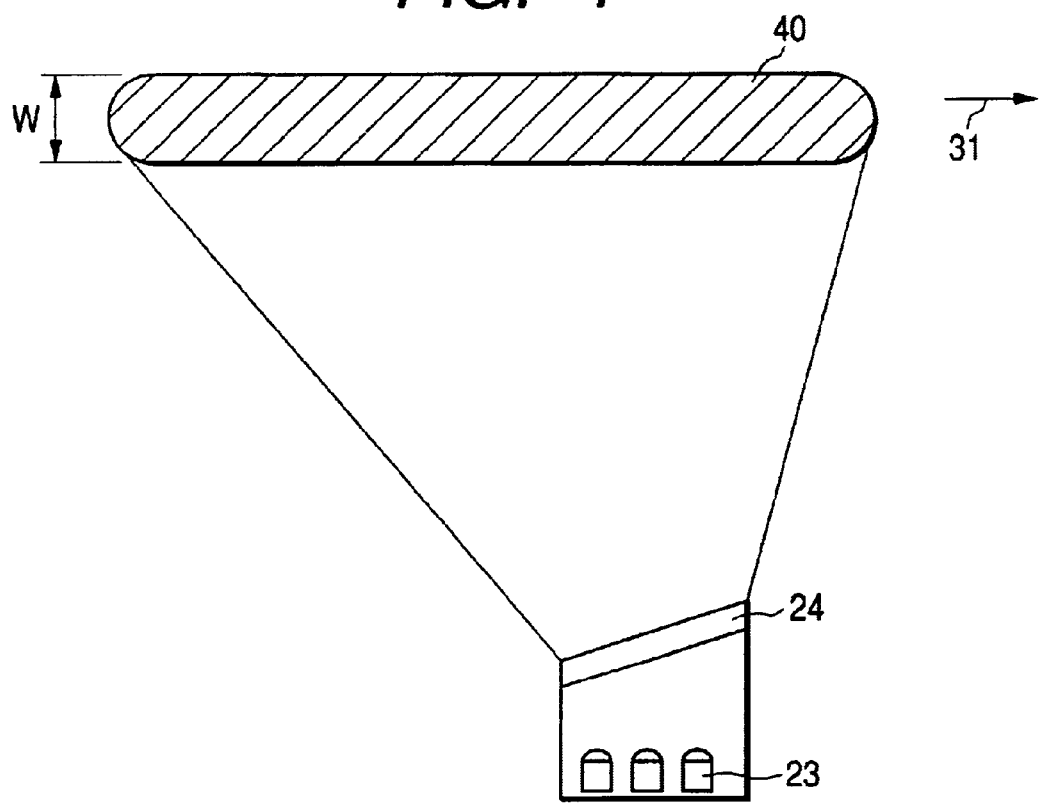
FIG. 4 is an illustration showing illumination operation according to this embodiment.
Figure 5:
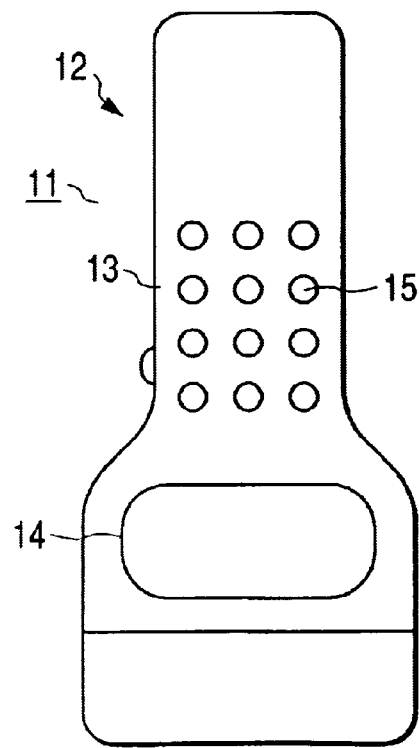
FIG. 5 is a plan view of a bar code reader according to this embodiment.
Figure 6:
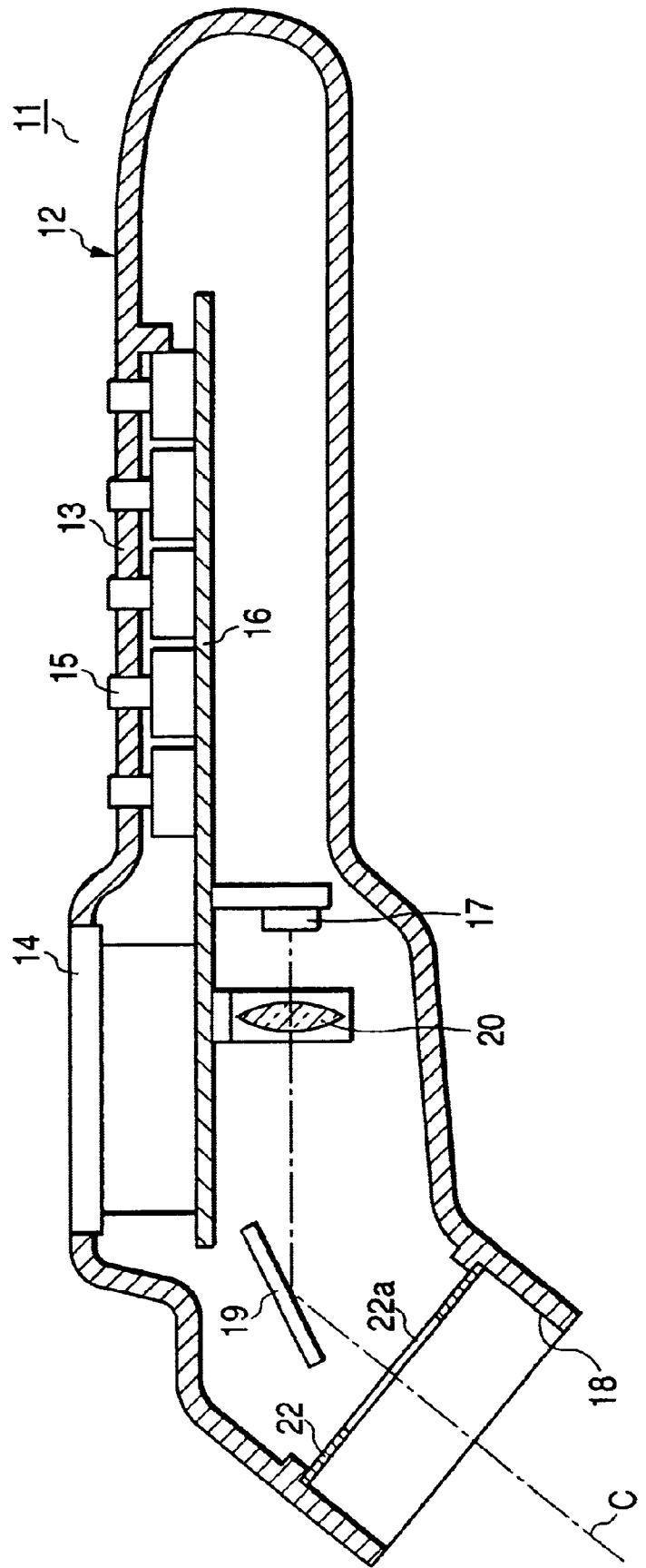
FIG. 6 is a sectional view of the bar code reader according to this embodiment.

A bar code reader will be described as an optical data form reading apparatus according to an embodiment of the present invention with reference to FIGS. 1 to 6. FIG. 5 shows an outline structure of the bar code reader 11. FIG. 6 shows a sectional side elevation view of the bar code reader 11. The bar code reader 11 includes a portable case 12. The portable case 12 contains and supports a printed circuit board 16. The printed circuit board 16 supports a display 14 and key switches 15 on one surface thereof as shown. On the other surface of the printed circuit board 16, a line sensor 17 is arranged. In front of the line sensor 17, an objective lens 20 is arranged on the printed circuit board 16.

Figure 1:
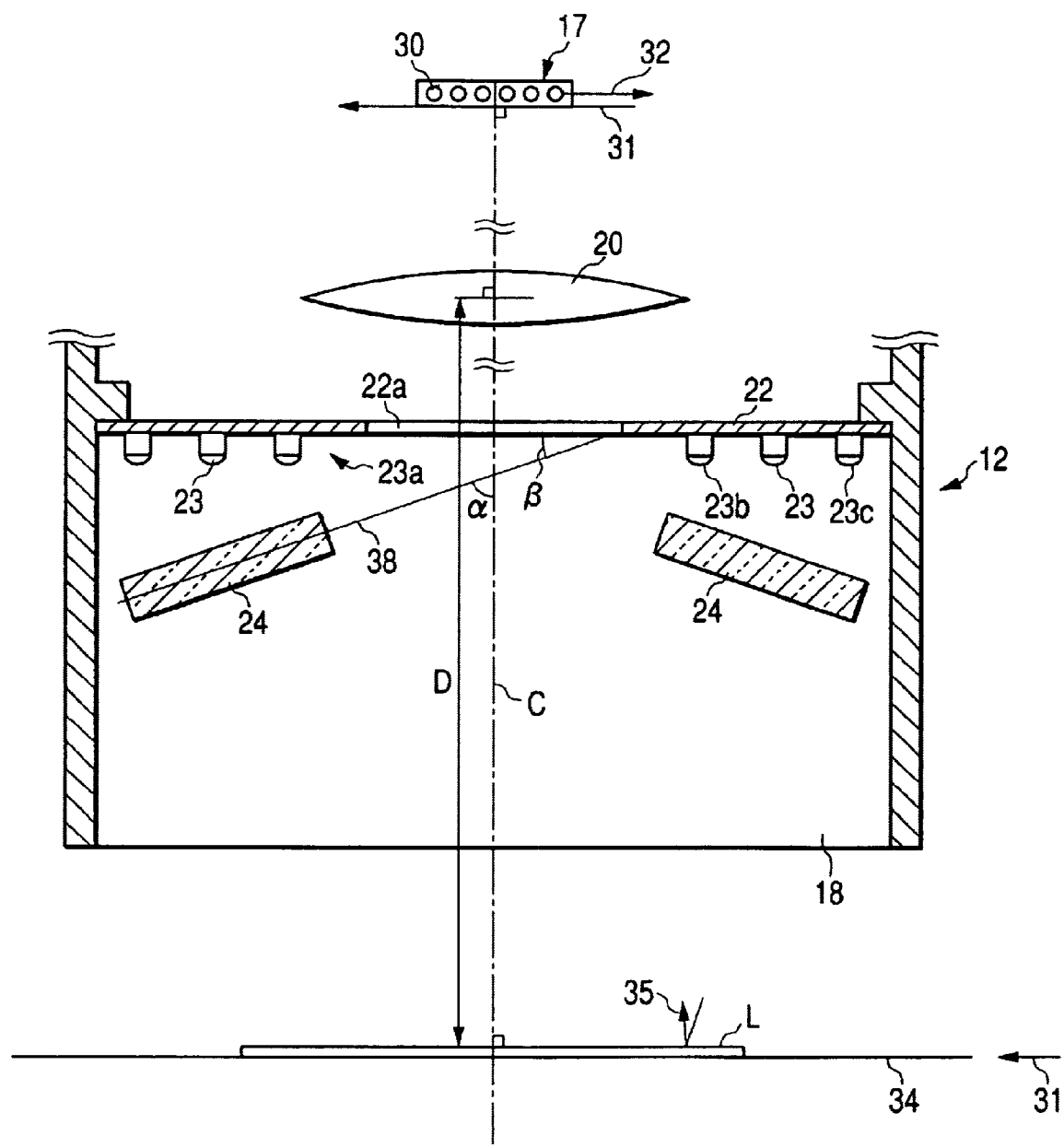
FIG. 1 is a sectional plan view of a bar code reader according to an embodiment of the present invention.
Figure 2A:
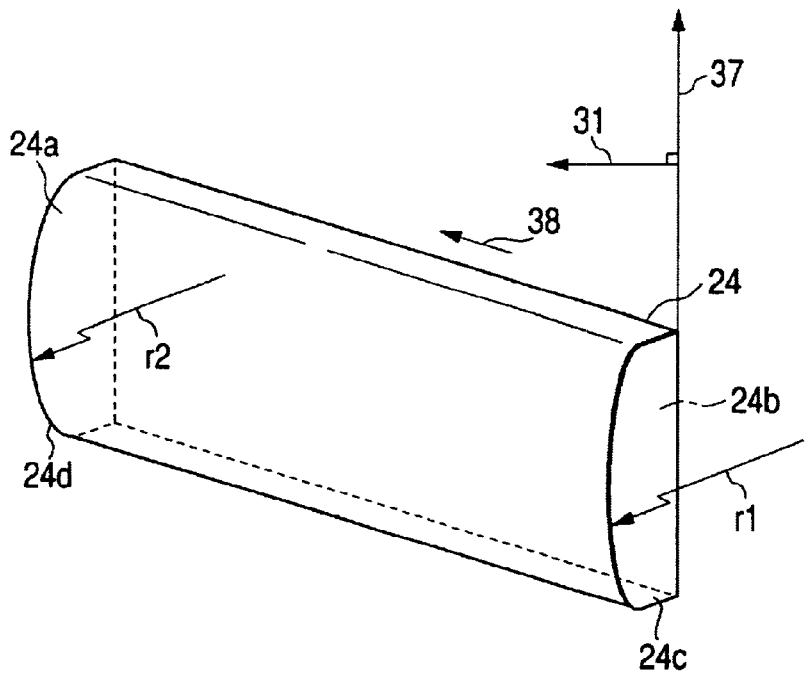
FIG. 2A is a perspective view of a projection lens according to the embodiment.
Figure 2B:
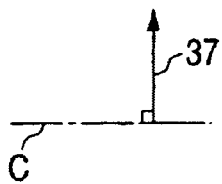
FIG. 2B is an illustration showing an angle relation between the optical axis of the objective lens and the second direction regarding the projection lens according to the embodiment.
Figure 3:
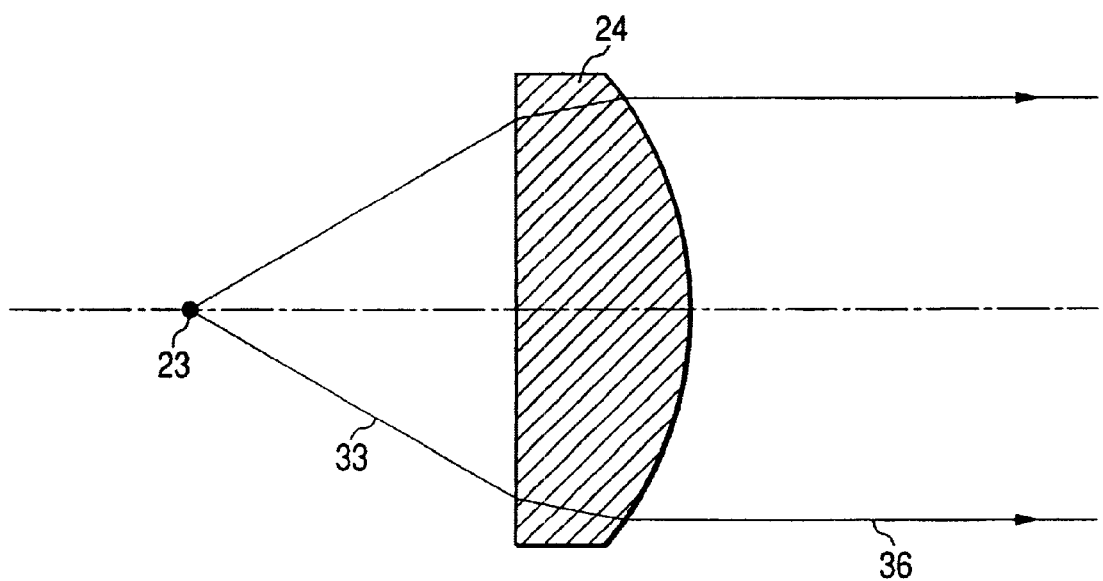
FIG. 3 is a sectional side elevation view of the projection lens according to the embodiment.

FIG. 1 shows a sectional plan view of the bar code reader 11. The line sensor 17 includes a plurality of photosensitive elements 30 aligned in line in a first direction 31. The line sensor 17 generates an image detection signal 32 indicative of the bar code image from the image formed thereon. The objective lens 20 has an optical axis C and a plurality of photosensitive elements 30 are arranged in the first direction 31 perpendicular to the optical axis C.

The printed circuit board 16 further includes a microprocessor (not shown) for processing the image detection signal to detect the code indicated by the bar codes and executing processes in response to the key switches 15.

The portable case 12 has a reading opening 18 at one end thereof. Near the reading opening 18, a mirror 19 is provided on the optical axis C to direct the light from the reading opening 18 to the objective lens 20 and the line sensor 17. That is, the mirror 19 bends the optical axis C. Hence, the mirror 19 reflects the image of bar codes on a label L to direct the beam of the image to the objective lens 20. The objective lens 20 arranged between the mirror 19 and the line sensor 17 focuses the image of the bar codes on the line sensor 17.

The reading opening 18 has a rectangular shape on a cross-sectional plane thereof, wherein the longitudinal side thereof (width direction) extends in the first direction 31.

Between the mirror 19 and the reading opening 18, another printed circuit board 22 having a through hole 22a for passing the reflected light therethrough is supported by the portable case 12. The printed circuit board 22 extends in the first direction. On one surface of the printed circuit board 22 on the side of the reading opening 18, LED arrays 23a are arranged beside the axis C (on both sides of the axis C) substantially in the first direction 31. Each LED arrays 23a includes LEDs 23 arranged in the first direction 31.

In front of the LED arrays 23a (between the LED arrays 23 and the reading plane 34), projection lenses 24 are arranged, respectively. Each of projection lenses 24 extends in a third direction (extending direction) 38 which has an inclined angle α (not 90°) from the axis C to direct the illumination light therefrom toward a reading plane 34 where the label L is placed. In other words, the extending direction is inclined from the first direction 31 by β. The reading plane 34 is normal to the axis C and at a predetermined distance D from the objective lens 20 to focus the image of the bar codes on the surface of the line sensor 17.

The projection lens 24 is made of plastic and has a half circular bar shape extending in the third direction 38. The projection lens 24 has a flat surface 24b on the side of the LED arrays 23a and a convex surface 24a of which curvature varies along the projection lens 24 (in the first direction 31 or the third direction 38). At one (outer) end 24c of the projection lens 24, the convex surface 24a has a curvature of a radius r1 which is greater than the curvature of a radius r2 at the other (inner) end of the projection lens 24. The projection lens 23 collimates the illumination light 33 to generate the collimated light 36 regarding the second direction 37. The second direction 37 is perpendicular to the optical axis C and the first direction 31.

The distance between the LED 23c near the portable case 12 and the projection lens 24 is greater than that of the LED 23b near the optical axis C, so that the radius r1 is smaller than the radius r2 at the side of the LED 23b for collimation. That is, the shorter distance requires the shorter radius of the curvature of the lens surface. The radius successively varies along the third direction 38. However, it is also possible that the curvature varies stepwise.

As mentioned, the projection lens 24 has at least a convex surface 24a of which curvatures r1, r2 are arranged substantially in the first direction 31 and varies in the first direction 31 to make the illumination light substantially collimated regarding the second direction 37 along the projection lens 24 (in the third direction 38).

In general convex lenses, if the curvature varies, the focal distance will varies. Thus, in the above-mentioned projection lens 24, the focal distance varies along its extending direction 38. A radius just in front of (confronting) each LED 23 is determined such that the position of the LED 23 agrees with the focal point derived from the radius there. That is, the curvature confronting each of the LEDs 23 provides a focus point substantially at each of the LEDs 23.

Moreover, in general convex lenses, if it is assumed that the focal distance is f, its refractive index is n, a radius of curvature on one surface of the convex lens is Ra, and a radius of curvature on the other surface is Rb, the following equation is provided.

$$(1/f) = (n-1)[(1/Ra) + (1/Rb)] \quad (1)$$

In this embodiment, the projection lens 24 has a flat surface on the side of the LEDs 23, so that the radius of curvature is infinite. Then, if the Rb is assumed to be a radius of curvature of the flat surface on the side of the LEDs 23, Rb=∞. This makes the term (1/Rb) zero. Then, another equation is provide as follows:

$$(1/f) = (n-1)(1/Ra) \quad (2)$$

Accordingly, the radius of curvature Ra on the other side of the projection lens 24 at each point along its extending direction 38 is determined such that focal distance f at the point agrees with the distance between the projection lens 24 and each LED 23.

According to this structure, because each LED 23 positions at a focal point of the projection lens 24, the illumination light emitted by each LED 23 is condensed and made collimated. The collimated beam 36 is projected on bar codes on the label L (a readable target) such that the collimated beam provides an illuminated stripe 40 of which width W is substantially constant. Moreover, brightness at the stripe 40 is constant along the stripe 40 (in the first direction 31) as shown in FIG. 4. The reflected light 35 from the label L is focused onto the line sensor 17 to form a data form image there.

Figure 7:
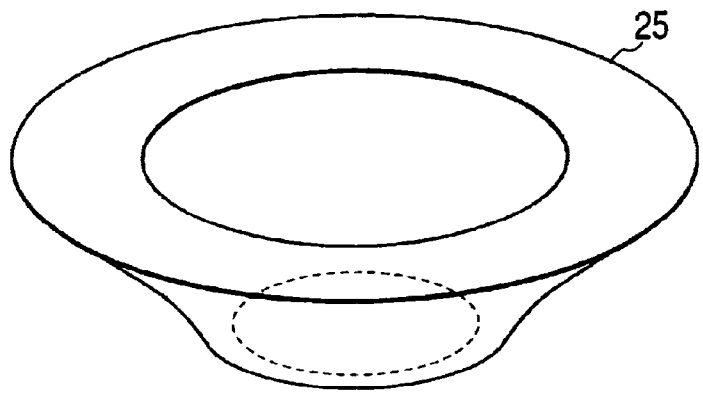
FIG. 7 is a perspective view of a modification of the present invention.
Figure 8:
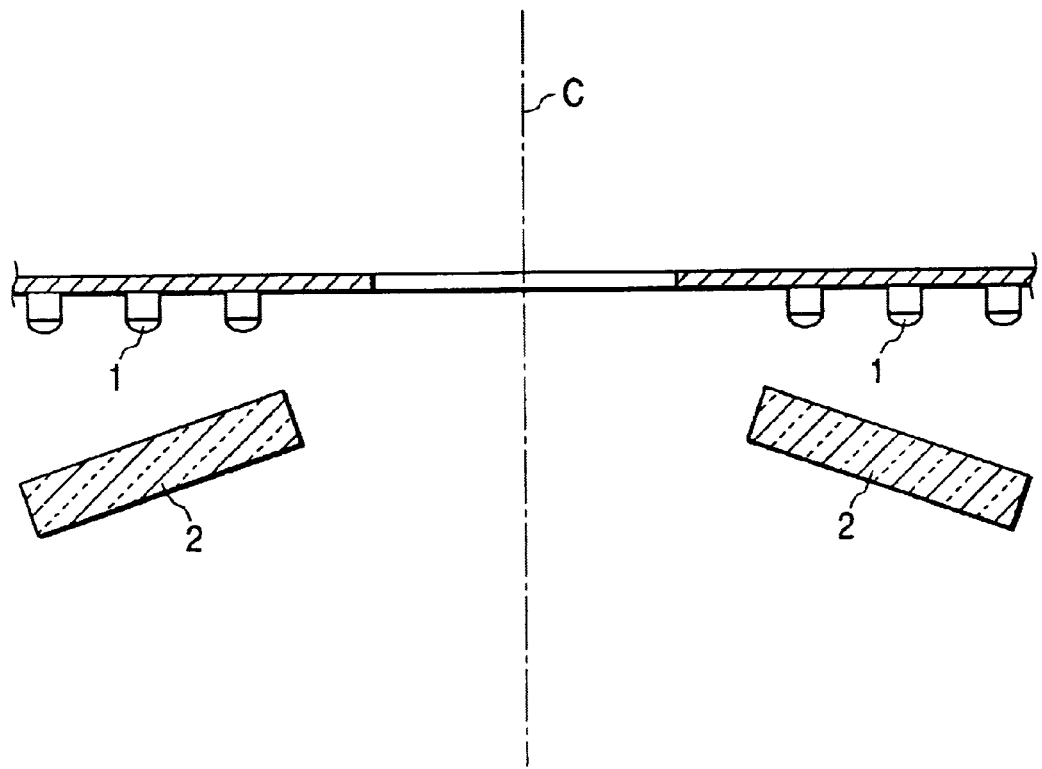
FIG. 8 is a sectional view of an illumination optical system of a prior art bar code reader.
Figure 9:
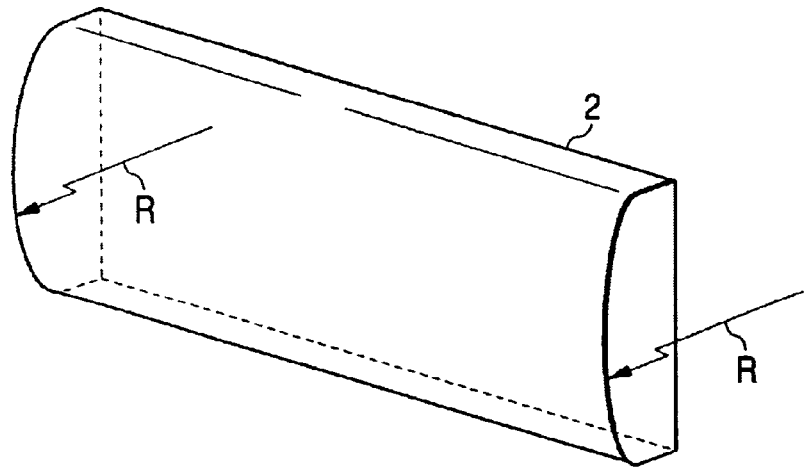
FIG. 9 is a perspective view of a projection lens of the prior art bar code reader.
Figure 10:
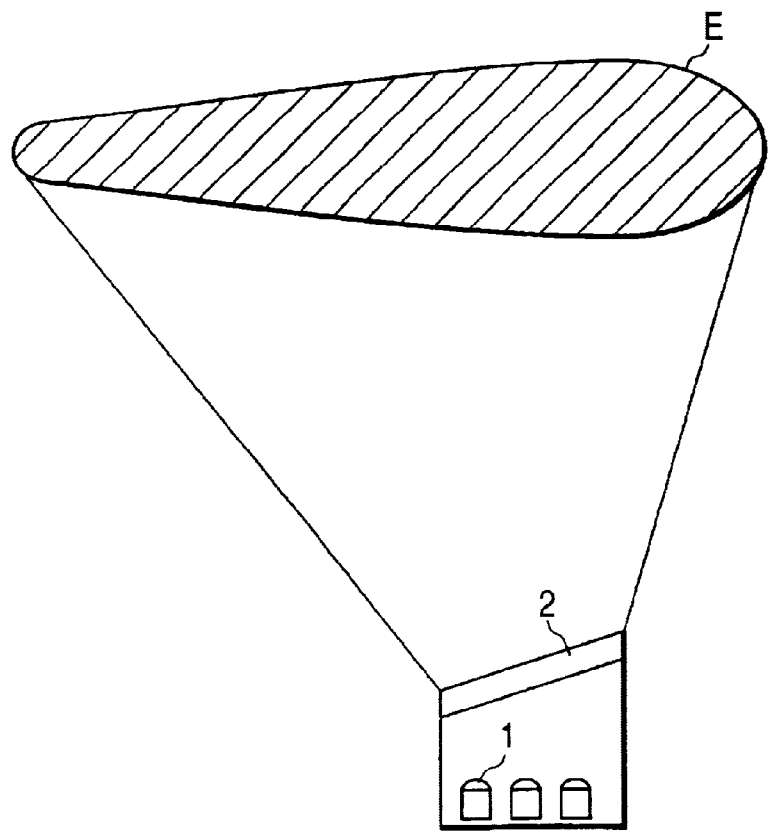
FIG. 10 is an illustration showing illumination operation according to the prior art bar code reader.
Figure 11:
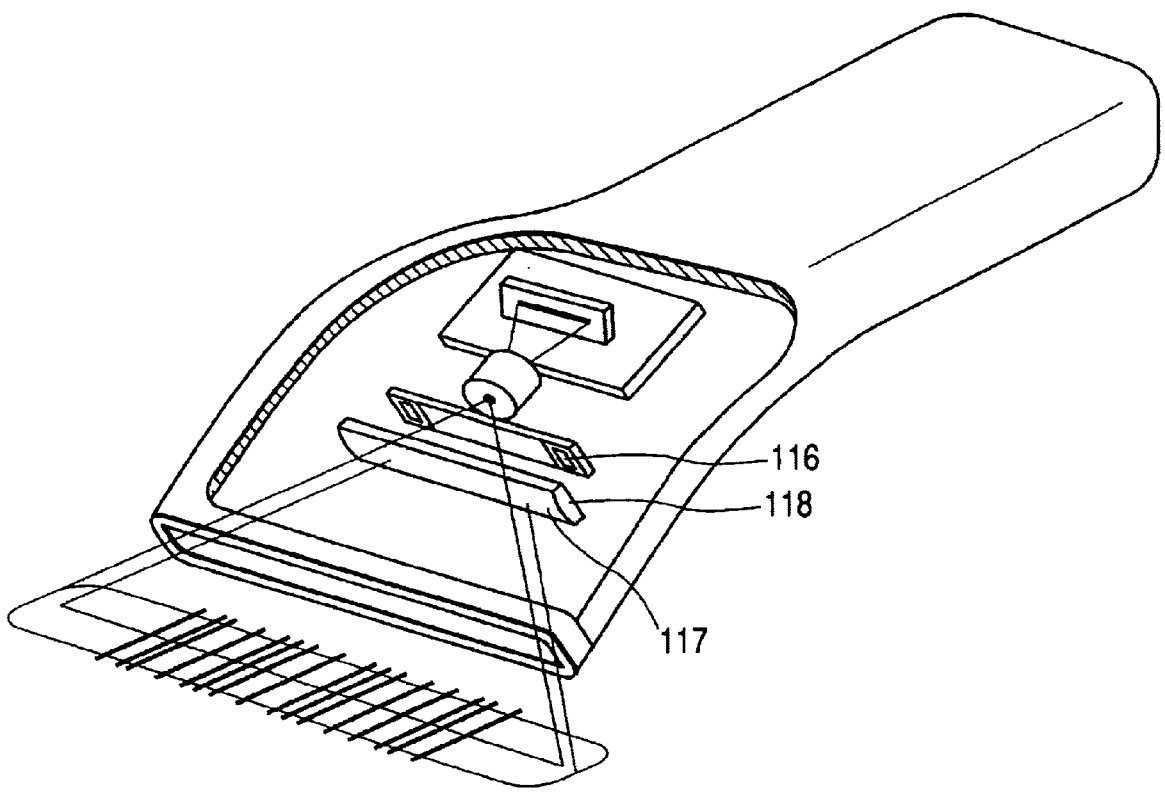
FIG. 11 is a perspective view of another prior art bar code reader.
Figure 12:
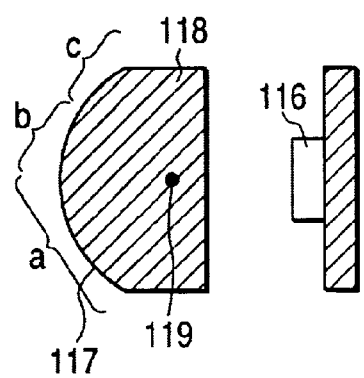
FIG. 12 is a sectional view of the projection lens of another prior art bar code reader.

FIG. 7 is a perspective view showing a modification of a projection lens according to this invention. This projection lens 25 is provided for a portable two-dimensional code reader. This code reader includes an area sensor in which photosensitive elements are two-dimensionally arranged, for example, a CCD area sensor. The objective lens focuses the light reflected by a two-dimensional code on the area sensor. Around the objective lens a plurality of LEDs are equidistantly arranged from the axis of the objective lens at a regular angular position on a printed circuit board.

The projection lens 25 is formed into substantially a bell-mouthed shape to condense and project the illumination light from a plurality of LEDs on the two-dimensional cod label. The curvatures of the inner and outer surfaces vary in the arranging direction of the elements of the two-dimensional sensor, that is, the vertically and horizontal directions. This structure provides a circular spot illumination without unevenness in brightness on the two-dimensional code label.

This invention provides further various modifications. For example, the number of the LED 23 in portable bar code reader 11 using the line sensor 17 may be one. In this case, the curvature is determined such that the focal distance at each point along the extending direction 38 agrees with the distance from each point to the position of the LED 23. Accordingly, the radius of the curvature just in front of (confronting) the LED 23 is smaller than radiuses at other points.

What is claimed is:

1. A data form reading apparatus comprising:

an objective lens;

an optical sensor having a plurality of photosensitive elements arranged in a first direction which is perpendicular to an optical axis defined by said objective lens;

light emitting means for emitting illumination light, wherein said light emitting means includes a plurality of light emitting elements arranged in said first direction beside said optical axis; and a projection lens for condensing and projecting said illumination light on a readable target, said objective lens focusing reflected light from said readable target on said optical sensor to generate an optical detection signal from said optical sensor, wherein said projection lens has at least a convex surface having curvature in a second direction which varies in said first direction to make said illumination light substantially collimated regarding said second direction along said projection lens in said first direction, and said second direction is perpendicular to said first direction and said optical axis, wherein said projection lens is arranged between said light emitting means and a reading plane of said readable target and extends in a third direction which is inclined to said optical axis, said convex surface curves only in said second direction, and said curvature just in front of each of said light emitting elements provides a focus point substantially at each of said light emitting elements, and wherein said projection lens has a flat surface on the aide of said light emitting means and said convex surface at the other side, said convex surface curves only in said second direction, if it is assumed that said curvature at each point on said convex surface is Ra, a refraction index of said projection lens is n, and a focal distance at each point is f, (1/f)=(n−1)(1/Ra).

2. An optical data form reading apparatus comprising: an objective lens;

an optical sensor having a plurality of photosensitive elements arranged in a first direction which is perpendicular to an optical axis defined by said object lens;

a light emitting linear array including a plurality of light emitting elements arranged in said first direction for emitting illumination light; and a projection lens for condensing and projecting said illumination light on a readable target, said objective lens focusing reflected light from said readable target on said optical sensor to generate an optical detection signal from said optical sensor, wherein said projection lens has at least a convex surface having curvature in a second direction which varies in said first direction to make said illumination light substantially collimated regarding said second direction along said projection lens in said first direction, and said second direction is perpendicular to said first direction and said optical axis, wherein said projection lens is arranged between said light emitting linear array and a reading plane of said readable target and extends in a third direction which is inclined to said optical axis, said convex surface curves only in said second direction, and said curvature just in front of each of said light emitting elements provides a focus point substantially at each of said light emitting elements, and wherein said projection lens has a flat surface on the side of said light emitting array and said convex surface at the other side, said convex surface curves only in said second direction, if it is assumed that said curvature at each point on said convex surface is Ra, a refraction index of said projection lens is n, and a focal distance at each of said places is f, $(1/f)=(n-1)(1/Ra)$.

3. An optical data form reading apparatus comprising:

an objective lens;

an optical sensor having a plurality of photosensitive elements arranged in a first direction which is perpendicular to an optical axis defined by said object lens;

light emitting means including a plurality of light emitting elements arranged in said first direction for emitting illumination light, wherein said light emitting means is arranged beside said optical axis;

condensing means for condensing and projecting said illumination light on optical data form, said objective lens focusing reflected light from said optical data form onto said optical sensor to generate an optical detection signal indicative of said optical data form from said optical sensor, and wherein said condensing means has at least a convex surface having curvature in a second direction which varies in said first direction to make said illumination light substantially collimated such that a width an illuminated pattern on a reading plane of said optical data form in said second direction is substantially constant, and said second direction is perpendicular to said first direction and said optical axis, wherein said condensing means is arranged between said light emitting means and said reading plane of said optical data form and extends in a third direction which is inclined to said optical axis, said convex surface curves only in said second direction, and said curvature just in front of each of said light emitting elements provides a focus point substantially at each of said photosensitive elements, and wherein said condensing means has a flat surface on the side of said light emitting means and said convex surface at the other side, said convex surface curves only in said second direction, if it is assumed that said curvature at each point on said convex surface is Ra, a refraction index of said projection lens is n, and a focal distance at each of said places is f, $(1/f)=(n-1)(1/Ra)$.

* * * * *